US010832581B2

(12) United States Patent
Westervelt et al.

(10) Patent No.: US 10,832,581 B2
(45) Date of Patent: *Nov. 10, 2020

(54) FLIGHT MANAGEMENT VIA MODEL-BASED ITERATIVE OPTIMIZATION

(71) Applicant: General Electric Company, Schenectady, NY (US)

(72) Inventors: Eric Richard Westervelt, Niskayuna, NY (US); Mark Lawrence Darnell, Grand Rapids, MI (US); Reza Ghaemi, Niskayuna, NY (US); David Lax, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/476,351

(22) Filed: Mar. 31, 2017

(65) Prior Publication Data

US 2018/0286254 A1    Oct. 4, 2018

(51) Int. Cl.
*G08G 5/00* (2006.01)
*G05D 1/00* (2006.01)

(52) U.S. Cl.
CPC ......... *G08G 5/0039* (2013.01); *G05D 1/0005* (2013.01); *G08G 5/0021* (2013.01); *G08G 5/0026* (2013.01); *G08G 5/0034* (2013.01)

(58) Field of Classification Search
CPC .................................................. G08G 5/0039
See application file for complete search history.

(56) References Cited

U.S. PATENT DOCUMENTS 4,760,530 A * 7/1988 Liden .................. G05D 1/0005
700/36
7,437,225 B1   10/2008 Rathinam
(Continued)

FOREIGN PATENT DOCUMENTS

WO            02099769 A1    12/2002

OTHER PUBLICATIONS

Sorensen et al., "Generation of optimum vertical profiles for an advanced flight management system", Analytical Mechanics Associates, Inc.; Mountain View, CA, United States, Mar. 1, 1981, 152 pp.

(Continued)

*Primary Examiner* — Michael A Berns
(74) *Attorney, Agent, or Firm* — Wood IP LLC

(57) ABSTRACT

A system, computer-readable medium, and a method including obtaining flight data for a specific aircraft for a prescribed flight; obtaining current sample measurements of at least one state or output of the specific aircraft; performing based on the obtained flight data, the current measurements or outputs, and a mathematical model accurately representing an actual operational performance of the specific aircraft and providing a predictive indication of a future performance of the specific aircraft, a control optimization to determine a cost-optimal control input for the prescribed flight; adjusting, in response to a consideration of actual operational characteristics of the specific aircraft, the optimized control input; and transmitting the adjusted optimized control input to the specific aircraft to operate the specific aircraft to minimize the direct operating cost for the prescribed flight.

20 Claims, 5 Drawing Sheets

(56) References Cited

U.S. PATENT DOCUMENTS

| | | | |
|---|---|---|---|
| 8,255,148 B2* | 8/2012 | Sacle | G05D 1/0005 |
| | | | 340/971 |
| 8,463,535 B2 | 6/2013 | Torres et al. | |
| 8,888,046 B2 | 11/2014 | Cremers | |
| 9,031,720 B2 | 5/2015 | Accardo et al. | |
| 9,460,629 B2* | 10/2016 | Chircop | G08G 5/0034 |
| 9,536,435 B1* | 1/2017 | Shay | G08G 5/045 |
| 9,625,261 B2* | 4/2017 | Polansky | G05D 1/0005 |
| 10,049,586 B2* | 8/2018 | Gallo Olalla | G08G 5/0052 |
| 10,086,948 B2* | 10/2018 | Gallo Olalla | G05D 1/0005 |
| 10,460,610 B2* | 10/2019 | Westervelt | G08G 5/0034 |
| 2014/0018980 A1 | 1/2014 | Bollapragada et al. | |
| 2016/0246277 A1 | 8/2016 | Nikovski et al. | |
| 2018/0239364 A1* | 8/2018 | Meulle | G08G 5/0034 |

OTHER PUBLICATIONS

Sam Liden, "Practical Considerations in Optimal Flight Management Computations", American Control Conference, 1985, pp. 675-681, Jun. 19-21, 1985, Boston, MA, USA, 7 pp.

* cited by examiner

FLIGHT MANAGEMENT VIA MODEL-BASED ITERATIVE OPTIMIZATION

BACKGROUND

The field of the present disclosure relates generally to flight management, more particularly, to systems, devices and methods of operation for flight management and applications thereof.

The cost of fuel is typically a large share of the operating expense in commercial aviation. As a consequence, operating efficiency and fuel savings are driving research for improvements in aircraft design and aircraft operations. The focus is primarily on those technologies that save fuel: aircraft and engine design, control design, and flight path planning and execution (called flight guidance).

Flight Management Systems (FMS) onboard aircraft typically determine climb, cruise, and descent speeds and constant cruise altitudes in an effort to reduce or minimize Direct Operating Cost (DOC) given takeoff weight and range and assuming a number of factors such as, for example, constant thrust for climb and idle thrust for descent. These simplifying assumptions have traditionally been applied to implement practical systems, even though such assumptions and simplifications yield suboptimal performance and compromised fuel savings. Additionally, conventional flight management systems are typically reactive to a current state or states of an aircraft. In some aspects, the control system of the aircraft might continually react to current or past states of the aircraft in an attempt control operations of the aircraft.

Therefore, there exists a need for systems and methods that improve the optimization problem for flight that is not strictly reactive and without simplifying assumptions to achieve optimal guidance.

BRIEF DESCRIPTION

In one aspect, an embodiment of the present disclosure relates to obtaining flight data for a specific aircraft for a prescribed flight; obtaining current sample measurements of at least one state or output of the specific aircraft; performing based on the obtained flight data, the current measurements or outputs, and a mathematical model accurately representing an actual operational performance of the specific aircraft and providing a predictive indication of a future performance of the specific aircraft, a control optimization to determine a cost-optimal control input for the prescribed flight; adjusting, in response to a consideration of actual operational characteristics of the specific aircraft, the optimized control input; and transmitting the adjusted optimized control input to the specific aircraft to operate the specific aircraft to execute the prescribed flight to minimize the direct operating cost for the prescribed flight.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein.

Figure 1:
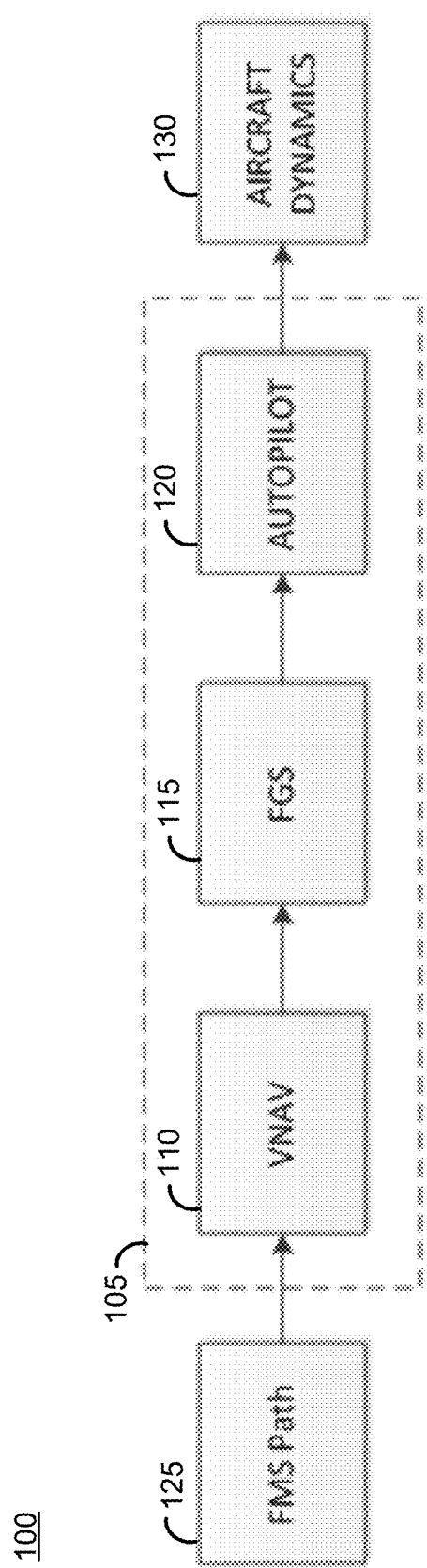
FIG. 1 is an illustrative depiction of one example of a block diagram for a legacy flight control system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

A conventional Flight Management System (FMS) of an aircraft in service today generally determines aspects of a flight plan, including but not limited to, climb, cruise, and descent speeds and altitudes, as well as a partial or complete trajectory or flight path. At least some of the data used by the FMS to generate the flight path (or aspects and portions thereof) can be received from a ground-based source. For example, a baseline flight plan filed for an aircraft may be received by the FMS and used in determining an "optimized" or, more accurately, a somewhat tuned flight path for an aircraft of the general type being flown. Additional and/or other data such as, for example, wind and temperature data and nominal aircraft characteristics for the aircraft may also be received and used by the FMS to calculate the flight plan that may be used for guidance of the aircraft. In some aspects, the flight plan calculated by the FMS may be determined using broad/general statistics and measures for the aircraft, where the statistical data may represent an average or mean for the aircraft that will fly the calculated flight path, and a number of assumptions regarding the operating characteristics of the aircraft and other performance constraints such as assumed/nominal or averaged air traffic control limitations and simplified equations of motion may be used in calculating the flight plan. Additionally, inaccurate estimates of the aircraft's weight and winds aloft may contribute to less than truly optimized flight trajectory determinations. For example, a lookup table or other predetermined static values including averaged control data values (e.g., "economy" control speeds and altitudes, etc.) may be referenced by the FMS (or other entity) and used by the aircraft's on-board FMS to construct a so-called "optimized" four-dimensional (4-D including latitude, longitude, altitude, and time) trajectory for the aircraft using the "economy" control targets, wherein the calculated trajectory may be used to guide the aircraft to the constructed path in a prescribed time frame.

In some aspects however, the resultant flight plan calculated by the airborne FMS (or other) system(s) may not produce a truly optimized flight path that can reliably and/or efficiently performed to minimize an intended DOC. For example, the scope and specificity of the flight data (i.e., its level of customization to the specific flight plan, aircraft, weather and air traffic conditions, etc.) considered and even capable of being received, processed, stored, reported, and acted on by flight management (and other) systems of the aircraft may be limited by the processing power, memory, and connectivity capabilities of those systems and/or the fidelity of the input data supplied to the FMS.

In some aspects, a conventional flight management system may generally be viewed as being reactive. That is, in some aspects a conventional flight management system may generally be viewed as being reactive since it determines control commands to fly a flight path based on past and perhaps some current actions of an aircraft, relying on past data events (i.e., backwards looking).

Referring to FIG. 1, an illustrative depiction of one example of a system 100 for guidance and navigation of an aircraft including a legacy conventional controller system 105 is shown. Controller 105 includes a vertical navigation (VNAV) module 110, a flight guidance system (FGS) 115, and an autopilot 120 module that may cooperate with each other to form at least a portion of an onboard steering and control function 105 of a particular aircraft.

VNAV 110 operates to compute vertical speed commands as a function of altitude deviations from a target path and FGS 115 performs autopilot and autothrottle functions and generates pitch commands as a function of the steering and control function's vertical speed control command(s). Autopilot 120 further operates to generate elevator surface deflections in the form of surface deflections commands that are provided to aircraft 130 to control the aircraft's dynamics. Additionally, steering and control function 105 commands the autothrottle to produce thrust. For example, if airspeed decreases below a threshold speed per the reference FMS flight path 125, then commands are sent to the autothrottle to regulate an increase in airspeed. If the airspeed were to increase above a threshold speed, then steering and control function 105 can generate a command or indication for a reduction in speed (e.g., a command automatically executed by the autopilot or an indication to notify a pilot to reduce the aircraft's speed).

Controller 105 may operate to control operations of aircraft 130 on which system 100 is installed. There may be one or more sensors that are used to measure certain properties of the aircraft and/or the environment and operational parameters and/or outputs of the aircraft. Sensor data from the sensors may be provided to steering and control function 105 for feedback control of the aircraft.

According to one embodiment, the present disclosure includes applying a predictive element aspect to a flight management system or controller to determine optimized aircraft navigation and control commands.

In some aspects, some of the systems and processes of the present disclosure offer greater computational capabilities as compared to conventional steering and control function and other aircraft flight controllers. Also, in some embodiments, a process and system may use accurate mathematical models of an aircraft, its engines, and the future atmospheric conditions the aircraft will be subjected to when employing control commands generated by the process and system to efficiently compensate for unwanted transient performances introduced by the aircraft, its engines, and/or the atmosphere when executing the flight plan.

Figure 2:
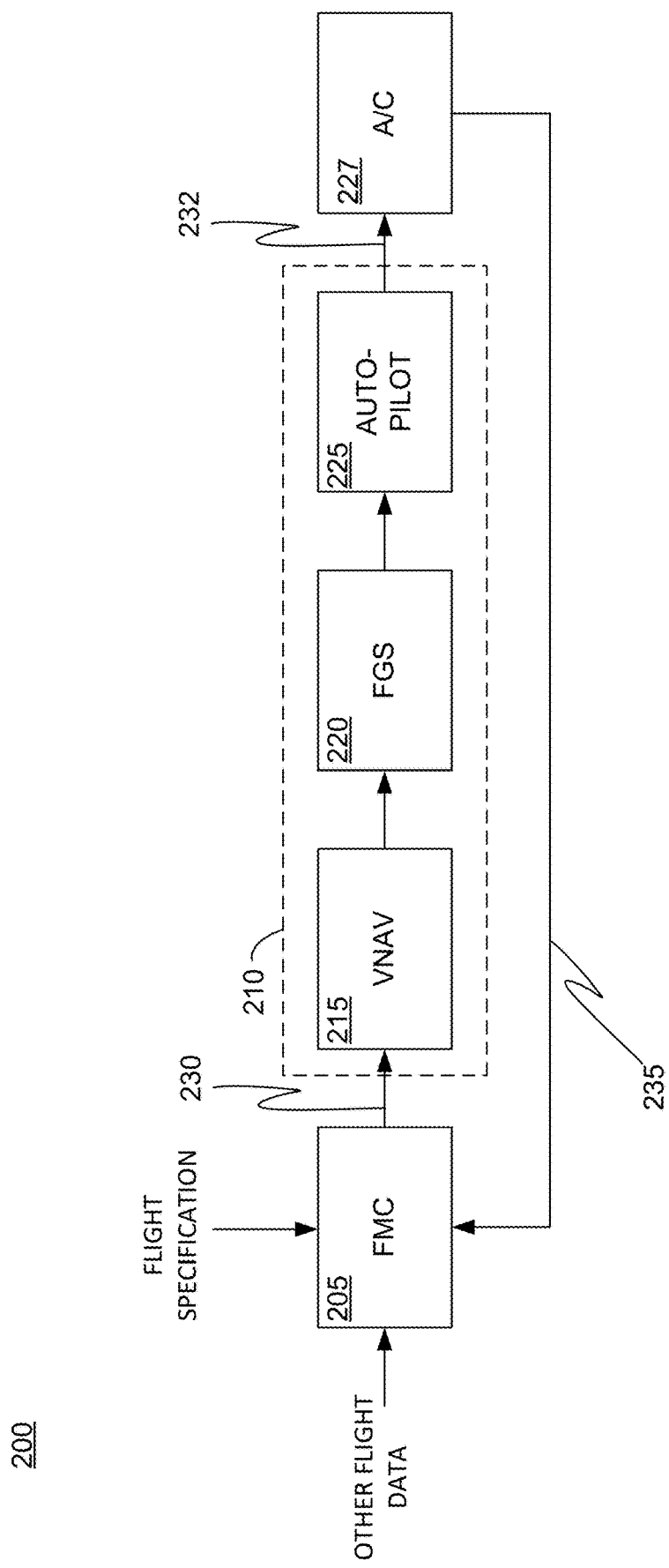
FIG. 2 is an illustrative depiction of one example of a schematic block for a predictive flight management system framework, according to some embodiments herein.

FIG. 2 is an illustrative schematic block diagram of a system 200, according to one example embodiment herein. In the example of FIG. 2, system 200 includes a flight management computer having a predictive aspect that replaces the functionality steering and control function 105 in FIG. 1. In some embodiments, FMC 210 is not limited or constrained to replicating the functionalities of steering and control function 105 or other legacy flight management or the like systems and controllers. In some aspects of the present disclosure, FMC 205 may include additional, fewer, and alternative functionalities as compared to a conventional aircraft steering and control function or controller. In some aspects, FMC 205 may execute all aspects from planning an optimal mission to execution of that mission on an airframe by directly specifying the aerodynamic objectives (e.g., thrust, the deflection of control surfaces, etc.). In this manner, FMC 205 may be an augmentation and/or improvement over prior system (e.g., steering and control function 105 of FIG. 1). In one aspect, FMC 205 is a departure from steering and control function 105 since the FMC 205 output(s) from FMC 205 are fundamentally different than the outputs of, for example, steering and control function 105.

FMC 205 includes a model-predictive controller that is used to generate control histories and corresponding state trajectories that minimize direct operating costs (DOC) of a particular aircraft. In some embodiments, a DOC might be but is not limited to a fuel cost for executing a prescribed flight plan or at least parts thereof.

In some embodiments, while system 200 might include at least one or more of the functionalities provided by the components of steering and control function 105 100 depicted in FIG. 1 (e.g., VNAV 110, FGS 110 and autopilot 120), FMC 205 of FIG. 2 need not include the same type of components or analogous devices that perform like functions. In some embodiments, FMC 205 may comprise technologies, mechanisms, protocols, inputs, and considerations, including but not limited to different sources and types of data, computational techniques, and mechanisms (e.g., hardware, software, devices, systems, and components, etc.), including those now known and those that may become known in the future. As such, FMC 205 is not constrained to being be built on or interfacing with a legacy system such as, for example, system 100. Moreover, system 200 may include functionalities, including processing accuracy, efficiency, and power, not provided by a conventional FMS such as the type disclosed in FIG. 1.

In some aspects, FMC 205 uses a control methodology wherein a current control action is obtained by solving an optimization problem at a series of successive sample instances in time. In some embodiments, the methodology uses a model predictive control (MPC) to predict a future performance of the aircraft and adjusts current control input action(s) to further control the aircraft to perform in an optimized manner.

Referring again to FIG. 2, FMC 205 receives as inputs a flight specification and other flight related data. In some embodiments, the flight specification may include constraints on the aircraft, a starting location/airport of a prescribed flight for a particular aircraft, a destination location/airport for the prescribed flight, transient performance limits for the particular aircraft (i.e., tail specific values, not assumptions and/or static or averaged values, etc.), and other data, including all data that might be included in a flight plan. The other flight data received as an input by FMC 205 might include, in some embodiments, weather forecasts, air traffic control data including, but not limited to, information relevant to the particular aircraft's execution of the prescribed flight plan, and additional relevant data. FMC 205 processes the input data (e.g., the flight specification and the other flight data) to generate control histories and trajectories to minimize a DOC, wherein these commands 230 are used by a flight control system 210 to control operational aspects of aircraft 227 in executing a prescribed flight. The control commands 230 may include, for example, control surface commands to control surface deflections of the aircraft, engine thrust settings, and other commands to control an operation of the aircraft, where the flight control system is represented by VNAV 215, FGS 220, and autopilot 225.

The optimized control command(s) generated by FMC 205 may be directly used by flight control system 210 to control a trajectory of the aircraft 227. Measurements 235 indicative of a current state or output of the aircraft are obtained from aircraft 227, where the aircraft's current state and/or output thereof are a response to the current control commands. The current state of the aircraft may be determined and calculated based on one or more sensor outputs, observances, or derivations from measurable and/or observed behaviors of the particular aircraft. Measurements and/or outputs 235 from aircraft 227 are further fed back to FMC 205.

In response to receiving the measurements and/or outputs 235 indicative of the aircraft's current state, FMC 205 uses that information to determine optimized reference commands optimized to minimize a direct operating cost (DOC) to meet one or more desired transient performance limits of the particular aircraft for the prescribed flight. In consideration of the actual operational characteristics (e.g., deficiencies, anomalies, etc.) of flight controller system 210, these generated optimized reference commands 230 (e.g., control surface commands to control surface deflections of the aircraft, engine thrust settings, and other commands to control an operation of the aircraft) may be periodically updated, adjusted, shaped, and/or modified in a continuing effort to control the aircraft operate in an optimized manner.

In some aspects herein, system 200 understands how the system will respond (i.e., react) to a reference command signal 230 and determines control commands 232 that are optimized to control the aircraft 227 to perform in the desired manner (i.e., minimize DOC) given the operational realities of flight control system 210. In some aspects, FMC 205 may operate to modify or adjust a reference signal (i.e., control input) to leverage the actual processing characteristics of flight control system 210. In some embodiments, system 200 regulates the reference commands 230 generated by FMC 205 to control the aircraft 227 to fly optimized trajectories to minimize DOC.

In an example, a flight guidance component, an autopilot functionality, and a navigation module of an aircraft control system might cooperatively operate such that they have some trouble with a descent profile or some other reference input, as indicated by a tracking of the aircraft's performance in response to the input of the reference to the system. The performance of the aircraft may be improved or otherwise changed to approach a desired outcome (i.e., the desired descent flight path) by changing the reference input(s) to compensate for the undesired effects (e.g., a time or phase lag, etc.) the guidance, autopilot, and navigation components/functionalities will impart on the reference signal.

Figure 3:
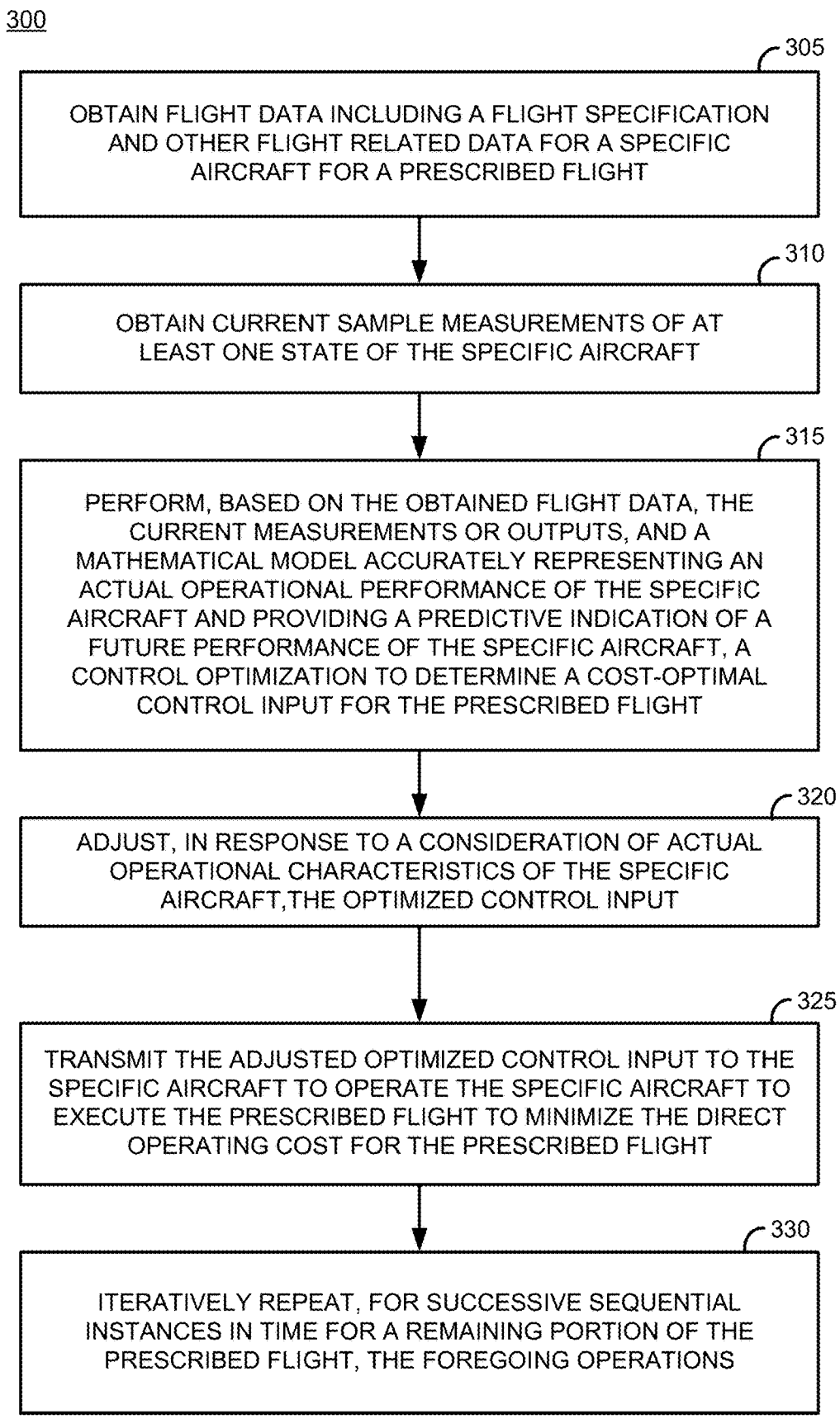
FIG. 3 is an illustrative example of a flow diagram of a process, according to some aspects herein.

FIG. 3 is an illustrative flow diagram of one example embodiment of a process 300. Process 300 may be executed by a system, an apparatus, and combinations thereof, including a flight management controller located entirely onboard an aircraft or distributed across computing systems and networks including a combination of onboard, satellite, and ground systems. In some instances, a system or device having a processor may execute program instructions of, for example, an application or an "app" embodied as a tangible medium to effectuate the operations of process 300. In some embodiments, at least a portion of process 300 may be implemented by software components deployed as software as a service.

At operation 305, flight data for a prescribed flight is obtained. The flight data obtained may be from either an airborne system of a particular aircraft to execute the prescribed flight or an external computational asset such as a ground based system and a satellite based system. In some aspects herein, an external computational asset refers to a device, system, and component having a central processing unit (i.e., processor) that is separate and distinct from a flight management and/or flight control system of an aircraft. In some embodiments, the computational processing power, processing speed, data access bandwidth capability, data processing capabilities, interconnectivity capabilities to other systems, and combinations thereof of an external computational asset herein may be greater than such features of an aircraft's on-board (i.e., native) flight management and flight control systems. An external computational asset herein may include the technical functionality to interface and communicate with other systems, including but not limited to, another external computational asset, flight management and flight control systems on-board an aircraft, and other types of systems via communication links (e.g., uplink, downlink) using different communication protocols and techniques.

The flight data may include details relating at least one of the particular aircraft and the parameters of the prescribed flight. For example, the flight data might include details relating to the particular aircraft and may include specific characteristics for the particular aircraft. Examples might include tail specific characteristics of the aircraft, including, for example, accurate performance and operational values for the particular aircraft such as thrust, drag, etc. that can be based on actual historical (i.e., past) performance, maintenance, and other types of data. Flight data including details relating to the parameters of the prescribed flight may include a filed (baseline) flight plan, nominal airplane characteristics for the particular aircraft (as opposed to actual characteristics for the specific, "particular" aircraft), and actual weather or environmental factors for the time the prescribed flight will be executed (as opposed to averaged weather conditions).

In some embodiments, at least some of the specific details of the flight data relating to the particular aircraft might include a data model, where the data model includes tail specific characteristics (i.e., performance and operational data relating specifically to the particular aircraft). The data model for the particular aircraft may include characteristics and parameters, including the values thereof, that are specific to the particular aircraft. In part, the specific details may be based on a history of previous flights conducted by the particular aircraft.

In some embodiments, the scope (i.e., level of detail and comprehensiveness) of the tail specific characteristics for the particular aircraft included in the flight data of operation 305 may be sufficient such that a data-based mathematical model (or other data structure) representing the aircraft actually closely matches the real-life operating performance of the particular aircraft. Given a high level of correspondence between the mathematical model and the operational performance of the particular aircraft, such an accurate data model is referred to herein as a "digital twin" of the particular aircraft. The digital twin includes an accurate and updated account of key characteristics/aspects of the particular aircraft. The scope and accuracy of a data model for the particular aircraft in some embodiments herein greatly contributes to the ability for process 300 to generate optimized path specific controls and an optimized trajectory. In some instances, the performance of an optimization realized by process 300 is enhanced and improved to achieve a lower DOC due to, at least in part, the use of a digital twin in some embodiments.

In some embodiments, data may be collected (i.e., observed, recorded, and maintained) for a specific aircraft over time. The detailed data collected (e.g., data including but not limited to thrust, drag, and other parameters) may be used to build an accurate data-based mathematical model for the particular aircraft. In some aspects, a mathematical model for a particular aircraft herein may be repeatedly updated, at least periodically, as the particular aircraft is operated. The intervals of time regarding the updating may be triggered or invoked in response to a change in aircraft specific characteristic data, significant maintenance modifications, etc. In some use-cases, the updated mathematical model may be used to perform a revised control optimization to generate updated cost-optimal control input(s).

At operation 310, current sample measurements or outputs of the aircraft are obtained. The current measurements and/or outputs are the result of the aircraft's response to some initial or reference input control command(s). The current measurements and/or outputs may be directly obtained from sensors and other devices or systems of the aircraft and, in some instances, derived from other measurements and outputs.

Continuing to operation 315, the FMC of some embodiments herein is used to perform a control optimization to determine a cost-optimal control input for the prescribed flight to minimize a DOC of the prescribed flight for the aircraft. The optimized control input is generated based on, at least in part, the obtained flight data from operation 305, the current measurements and/or outputs received in operation 310, and a mathematical model accurately representing an actual operational performance of the specific aircraft and providing a predictive indication of a future performance of the specific aircraft. The mathematical model accurately represents a real-world operational performance of the specific aircraft, including an operational performance of the aircraft and the engines configured therewith. In some aspects, the mathematical model might also accurately represent a performance of the steering and control function of the specific aircraft.

At operation 320, the optimized control input signal determined at operation 315 may be adjusted, modified, or otherwise shaped to account for the dynamics of the specific aircraft, including operational aspects of its steering and control function. In some embodiments, the flight management controller of the specific aircraft (e.g., FMC 205 in the example of FIG. 2) or another system having such functionality may be knowledgeable of the actual, real-world operating deficiencies, anomalies, and other characteristics of the aircraft (e.g., as represented by a data-based mathematical model) and consider those aspects in adjusting the optimized control input.

At operation 325, the adjusted optimized control input shaped at operation 320 is transmitted to the aircraft's steering and control function or system (e.g., 210 of FIG. 2) and the (sub-) systems thereof (e.g., VNAV 215, FGS 220, Autopilot 225, etc.), which in turn uses the adjusted optimized control input(s) to control the motion of the aircraft to execute the prescribed flight in an optimal manner, minimizing DOC as is desired.

Operation 330 includes iteratively repeating operations 305 through 325 for a series of successive instances in time until the prescribed flight is executed by the aircraft. In some instances, process 300 may be performed repeatedly for a period of time corresponding to an entire extent of a prescribed flight plan. In some scenarios however, the operations of process 305 through 325 might be performed for only a particular portion of a prescribed flight, such as one or more of an ascent, a cruising, and a descent portion of a prescribed flight.

In some embodiments, the optimization performed by a process herein, such as but not limited to process 300, may include a model predictive control (MPC) method where a current control action (e.g., control input) is obtained or determined by solving an optimization problem on-line at each sample instant in time. In part, MPC uses a dynamic constrained optimization at each time sampled instant and the controller adapts to the current state of the system (e.g., aircraft) to reject disturbances and anomalies, to leverage multi-variable interactions of components and sub-systems of the system, and to optimize a performance of the system under actual operational conditions. The optimization problem may be framed as a finite horizon open-loop optimal control problem where a current state of the system is used as an initial state and a sequence of control actions into the finite horizon is the solution to the optimization problem.

The MPC methodology uses a model of the aircraft. The model provides a mechanism for the MPC process to make predictions into the future and consider the effects of current input changes (e.g., control commands 230 of FIG. 2) on the future performance evolution of the system (e.g., aircraft 227). In some embodiments, techniques and processes other than MPC may be used to predict and optimize a further operation of an aircraft.

In some embodiments, data may be collected (i.e., observed, recorded, and maintained) for a specific aircraft over time. The detailed collected data (e.g., past data indicative of and/or including but not limited to thrust, drag, and other parameters) may be used to build an accurate data model for the particular aircraft. In some aspects, a data model for a particular aircraft herein may be repeatedly updated (i.e., periodically) as the particular aircraft is operated. The intervals of time regarding the updating may be triggered or invoked in response to a change in aircraft specific characteristic data. The updated data model may be used to perform a revised control optimization to generate updated optimized path specific controls for the prescribed flight.

In some embodiments, the data model may accurately and fully express the actual real-world constraints on the aircraft during the prescribed flight, including parameters directly related to the airframe, the engines of the aircraft, the weight of fuel, constraints in the airspace including the prescribed flight, weather conditions to be experienced during the flight, air traffic control warnings, etc. In some aspects, the data models herein, in addition to accurately and sufficiently representing the aircraft to a level of certainty to generate optimized controls, may also be conducive to optimization and computationally efficient so that the optimal control problem might be solved in real time to be practicable.

Further regarding some of the MPC aspects in the context of the present disclosure, a first control action (e.g., reference control command(s)) is applied to the system and at a next sample instance the optimization problem is re-posed and solved again with the finite horizon shifted by one sample time. Given that the control commands input to the system are the result of a finite-horizon optimization problem, relevant and actual operational constraints of the system can be explicitly addressed and processed by the MPC by expressing those constraints in terms of decision variables and appending them to the optimization problem so that they are factored into the optimization solution.

In some aspects, an MPC process herein may be summarized as including (1) sensing measured states or outputs of the subject system (i.e., an aircraft), (2) estimating states of the system that are needed for the optimization problem but not directly measured or sensed, where the estimates may be derived, calculated, or otherwise determined by one or more process without limit herein (e.g., using a Kalman filter, etc.); (3) solving the finite horizon constrained optimal control problem (e.g., minimizing DOC for a particular aircraft flying a prescribed flight); (4) applying the first sample of the optimal control to the system; (5) repeating steps (1)-(4) again at each subsequent time instant.

Figure 4A:
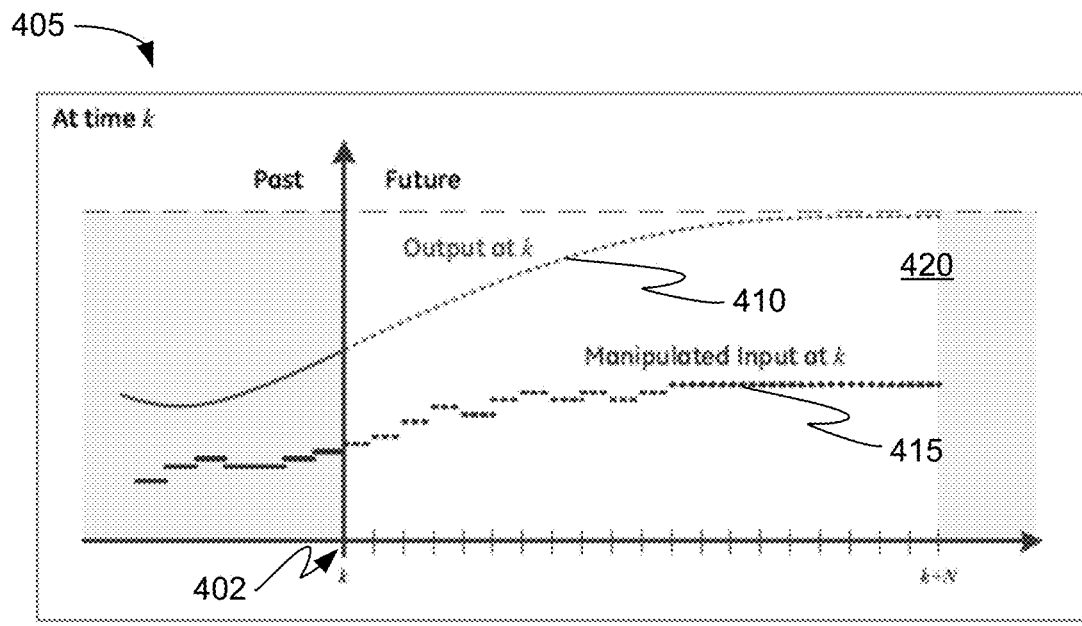
FIGS. 4A and 4B are illustrative graphs of same aspects of an iterative process of a predictive flight management framework, according to some aspects herein.
Figure 4B:
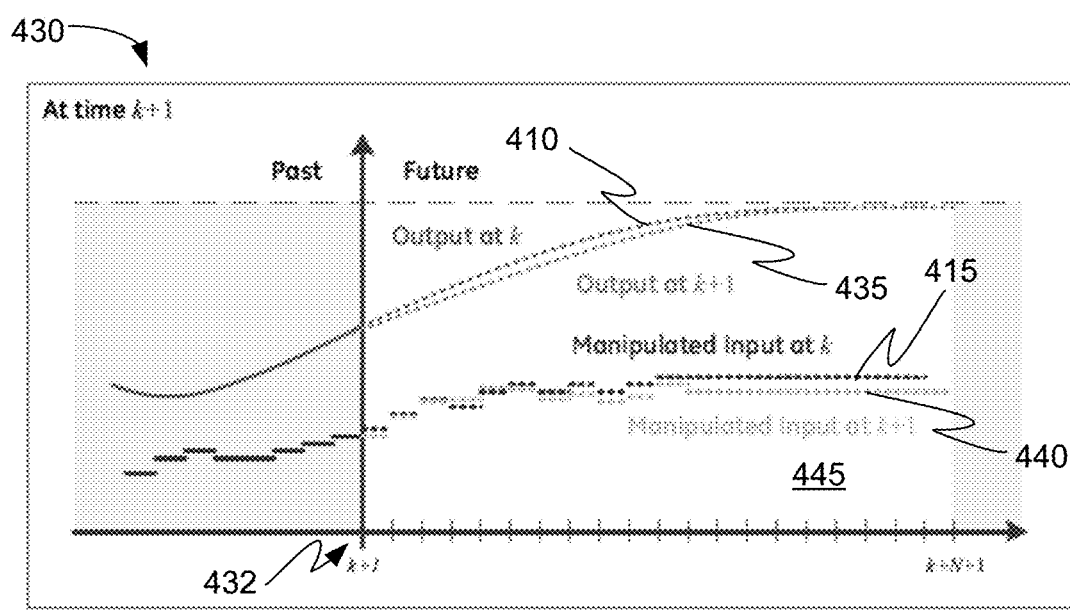

FIGS. 4A and 4B illustrates some aspects of the predictive and feedback correction aspects of the MPC process disclosed herein. FIG. 4A includes a graph 405 wherein an optimal control profile 415 is calculated for the entire prediction horizon 420 at time k (402). The calculated control profile ensures that the predicted output 410 at time k satisfies the performance objectives and constraints of the system. Only the first sample of the input is implemented until time step k+1. FIG. 4B includes graph 430 having an optimal control profile 440 that is calculated for the entire prediction horizon 445 at time k+1 (432). At time k+1, a new set of optimal control(s) 440 are calculated to account for model mismatch and disturbances. The predicted output 435 satisfies the performance objectives and constraints of the system.

As illustrated by some of the embodiments herein, the disclosed systems and methods herein may include, determining a cost-optimal control based on past states (e.g., as used in determining a data model for a specific aircraft), the current state (e.g., derived from measurements and outputs from the subject aircraft), and future states as determined by a model of the aircraft and engines and predictive features and then shaping the cost-optimized control input to a flight control system of the specific aircraft to account for the dynamics (e.g., deficiencies, anomalies, and other particular operating characteristics) of the specific aircraft and its control system such that the motion of the aircraft is the motion to minimize operating cost.

Figure 5:
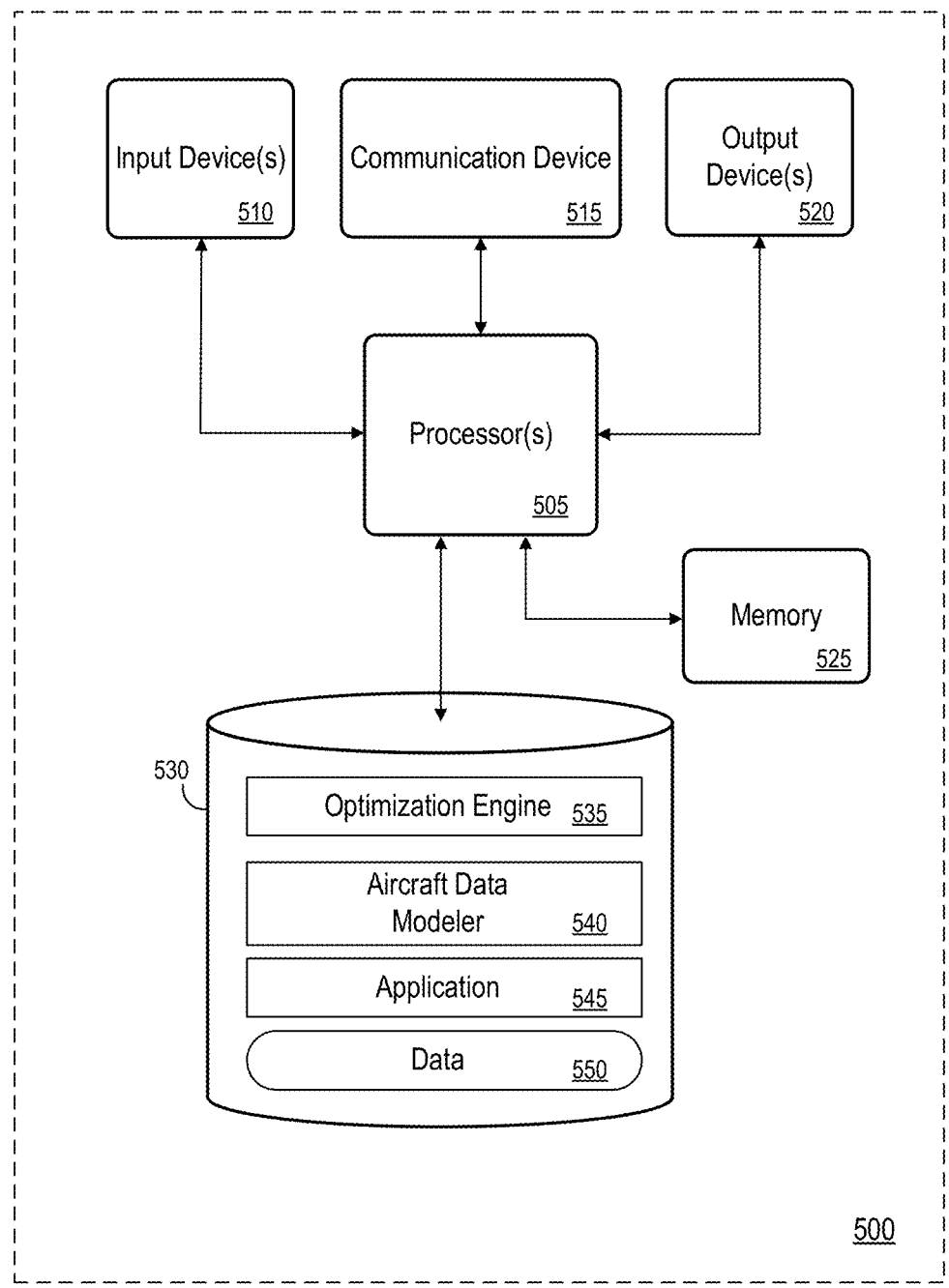
FIG. 5 is an illustrative depiction of a block diagram of a system or device that can support some processes disclosed herein.

FIG. 5 is an illustrative block diagram of apparatus 500 according to one example of some embodiments. Apparatus 500 may comprise a computing apparatus and may execute program instructions to perform any of the functions described herein. Apparatus 500 may comprise an implementation of server, a dedicated processor-enabled device, and other systems, including aircraft deployed systems and systems deployed in, for example, an external computational asset or facility, in some embodiments. Apparatus 500 may include other unshown elements according to some embodiments.

Apparatus 500 includes processor 505 operatively coupled to communication device 515 to communicate with other systems, data storage device 530, one or more input devices 510 to receive inputs from other systems and entities, one or more output devices 520 and memory 525.

Communication device 515 may facilitate communication with other systems and components, such as other external computational assets, an air traffic control network, and an aircraft. Input device(s) 510 may comprise, for example, a keyboard, a keypad, a mouse or other pointing device, a microphone, knob or a switch, an infra-red (IR) port, a docking station, and/or a touch screen. Input device(s) 510 may be used, for example, to enter information into apparatus 500. Output device(s) 520 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 530 might store a flight data plans, optimized controls command by some embodiments herein, etc.

Optimization engine 535, aircraft data modeler 540, and application 545 may comprise program instructions executed by processor 505 to cause apparatus 500 to perform any one or more of the processes described herein, including but not limited to aspects disclosed in FIG. 3. Embodiments are not limited to execution of these processes by a single apparatus.

Data 550 (either cached or a full database) may be stored in volatile memory such as memory 525. Data storage device 530 may also store data and other program code for providing additional functionality and/or which are necessary for operation of apparatus 500, such as device drivers, operating system files, etc. Data 550 may include performance data related an aircraft that may be used in future data modeling of the aircraft for optimization purposes.

The present disclosure includes a plurality of features and characteristics. The various features and characteristics disclosed herein have been presented primarily in the context of aircraft related methods, systems, and computer-readable embodiments and examples. The features and characteristics of the present disclosure may be applied to contexts, applications, and environments other than the aircraft spectrum. For example, the methods, systems, and computer-readable embodiments disclosed herein may be applied to autonomous and semi-autonomous assets other than, in addition to, and alternative to aircraft assets such as, for example, drones (either manned or unmanned), ships, trucks, cars, locomotives, equipment, etc.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include

What is claimed includes:

1. A method implemented by a processor of a computing system to optimize aircraft guidance to minimize direct operating cost of a prescribed flight, the method comprising:
obtaining flight data including a flight specification and other flight related data for a specific aircraft for a future prescribed flight, the flight specification including at least flight constraints, a starting location, a destination location, and transient performance limits of the specific aircraft; and the other flight related data including future atmospheric conditions the specific aircraft will be subjected to when employing control commands generated by the processor and executing the future prescribed flight, and air traffic control information relevant to the future prescribed flight;
generating control histories based on historical performances and generating corresponding state trajectories for the specific aircraft based on the flight data and performing model predictive control to predict a future performance of the specific aircraft and adjusting current control input actions to further control the specific aircraft to perform in an optimized manner during the future prescribed flight;
obtaining current sample measurements of at least one state or output of the specific aircraft during execution of the future prescribed flight;
performing, a control optimization by a processor of a computational asset of the specific aircraft, the control optimization being based on the obtained flight data, the current measurements or outputs by a feedback loop, and a mathematical model representing an actual operational performance of the specific aircraft and further providing a predictive indication of a future performance of the specific aircraft in response to a current state or input to the specific aircraft;
adjusting, in response to a consideration of actual operational characteristics of the specific aircraft, the optimized control input;
transmitting the adjusted optimized control input to the specific aircraft for use thereby to operate the specific aircraft to execute the prescribed flight to minimize the direct operating cost for a first portion of the prescribed flight; and
iteratively repeating, for successive sequential instances in time for a remaining portion of the prescribed flight, the operations of obtaining the flight data, obtaining the current sample measurements or outputs, performing the control optimization, adjusting the optimized control input according to the control optimization performed at each successive sequential instance in time, and transmitting the adjusted optimized control input to the specific aircraft.

2. The method of claim 1, wherein the successive sequential instances in time include a time from the initial obtaining of the current sample measurements to an end of the prescribed flight.

3. The method of claim 1, wherein the flight specification comprises a mathematical model including tail specific performance and operational characteristics for the particular aircraft.

4. The method of claim 3, wherein the mathematical model models at least the specific aircraft, engines of the specific aircraft, and atmospheric conditions for the flight during a future period of time when the adjusted optimized control input will be used to guide the specific aircraft.

5. The method of claim 1, wherein the actual operational characteristics include aspects of a flight control function of the specific aircraft.

6. The method of claim 1, wherein at least some of the flight data is obtained from a source separate and distinct from an airborne system of the particular aircraft.

7. The method of claim 1, wherein the at least one state of the specific aircraft, includes a plurality of states corresponding to a plurality of functions of the specific aircraft.

8. The method of claim 7, wherein at least one of the plurality of states is unknown based on the current sample measurements and an estimate for the at least one unknown state is determined, at least in part, based on at least one of the plurality of states known from the current sample measurements.

9. A system comprising:
a memory storing processor-executable program instructions; and
a processor to execute the processor-executable program instructions to:
obtain flight data including a flight specification and other flight related data for a specific aircraft for a future prescribed flight, the flight specification including at least flight constraints, a starting location, a destination location, and transient performance limits of the specific aircraft; and the other flight related data including future atmospheric conditions the specific aircraft will be subjected to when employing control commands generated by the processor and executing the future prescribed flight, and air traffic control information relevant to the future prescribed flight;
generating control histories based on historical performances and generating corresponding state trajectories for the specific aircraft based on the flight data and performing model predictive control to predict a future performance of the specific aircraft and adjusting current control input actions to further control the specific aircraft to perform in an optimized manner during the future prescribed flight;
obtain current sample measurements of at least one state or output of the specific aircraft during execution of the future prescribed flight;
perform a control optimization based on the obtained flight data, the current measurements or outputs by a feedback loop, and a mathematical model representing an actual operational performance of the specific aircraft and further providing a predictive indication of a future performance of the specific aircraft in response to a current state or input to the specific aircraft;
determine, based on the control optimization, a control input optimized to minimize a direct operating cost of the specific aircraft for the prescribed flight;
adjust, in response to a consideration of actual operational characteristics of the specific aircraft, the optimized control input;
transmit the adjusted optimized control input to the specific aircraft for use thereby to operate the specific aircraft to execute the prescribed flight to minimize the direct operating cost for a first portion of the prescribed flight; and
iteratively repeat, for successive sequential instances in time for a remaining portion of the prescribed flight, the operations of obtaining the flight data, obtaining the current sample measurements or outputs, performing the control optimization, adjusting the optimized control input according to the control optimization performed at each successive sequential instance in time, and transmitting the transmitting the adjusted optimized control input to the specific aircraft.

10. The system of claim 9, wherein the successive sequential instances in time include a time from the initial obtaining of the current sample measurements to an end of the prescribed flight.

11. The system of claim 9, wherein the flight specification comprises a mathematical model including tail specific performance and operational characteristics for the particular aircraft.

12. The system of claim 11, wherein the mathematical model models at least the specific aircraft, engines of the specific aircraft, and atmospheric conditions for the flight during a future period of time when the adjusted optimized control input will be used to guide the specific aircraft.

13. The system of claim 9, wherein the actual operational characteristics include aspects of a flight control function of the specific aircraft.

14. The system of claim 9, wherein at least some of the flight data is obtained from a source separate and distinct from an airborne system of the particular aircraft.

15. The system of claim 9, wherein the at least one state of the specific aircraft includes a plurality of states corresponding to a plurality of functions of the specific aircraft.

16. The system of claim 15, wherein at least one of the plurality of states is unknown based on the current sample measurements and an estimate for the at least one unknown state is determined, at least in part, based on at least one of the plurality of states known from the current sample measurements.

17. A non-transitory computer-readable medium having processor-executable program instructions stored thereon, the medium comprising:

program instructions to obtain flight data including a flight, specification and other flight related data for a specific aircraft for a future prescribed flight, the flight specification including at least flight constraints, a starting location, a destination location, and transient performance limits of the specific aircraft: and the other flight related data including future atmospheric conditions the specific aircraft will be subjected to when employing control commands generated by the processor and executing the future prescribed flight, and air traffic control information relevant to the future prescribed flight:

program instructions to generate control histories based on historical performances and to generate corresponding state trajectories for the specific aircraft based on the flight data and to perform model predictive control to predict a future performance of the specific aircraft and adjusting current control input actions to further control the specific aircraft to perform in an optimized manner during the future prescribed flight;

program instructions to obtain current sample measurements of at least one state or output of the specific aircraft during execution of the future prescribed flight;

program instructions to perform a control optimization based on the obtained flight data, the current measurements or outputs by a feedback loop, and a mathematical model representing an actual operational performance of the specific aircraft and further providing a predictive indication of a future performance of the specific aircraft in response to a current state or input to the specific aircraft;

program instructions to determine, based on the control optimization, a control input optimized to minimize a direct operating cost of the specific aircraft for the prescribed flight;

program instructions to adjust, in response to a consideration of actual operational characteristics of the specific aircraft, the optimized control input;

program instructions to transmit the adjusted optimized control input to the specific aircraft for use thereby to operate the specific aircraft to execute the prescribed flight to minimize the direct operating cost for a first portion of the prescribed flight; and program instructions to iteratively repeat, for successive sequential instances in time for a remaining portion of the prescribed flight, the operations of obtaining the flight data, obtaining the current sample measurements or outputs, performing the control optimization, adjusting the optimized control input according to the control optimization performed at each successive sequential instance in time, and transmitting the adjusted optimized control input to the specific aircraft.

18. The medium of claim 17, wherein the successive sequential instances in time include a time from the initial obtaining of the current sample measurements to an end of the prescribed flight.

19. The medium of claim 17, wherein the flight specification comprises a mathematical model including tail specific performance and operational characteristics for the particular aircraft.

20. The medium of claim 19, wherein the mathematical model models at least the specific aircraft, engines of the specific aircraft, and atmospheric conditions for the flight during a future period of time when the adjusted optimized control input will be used to guide the specific aircraft.

* * * * *